United States Patent [19]

Meier et al.

[11] Patent Number: 4,601,734
[45] Date of Patent: Jul. 22, 1986

[54] ARRANGEMENT FOR THE REMOVAL OF DUST FROM GAS STANDING UNDER PRESSURE

[75] Inventors: Hans-Joachim Meier, Wesel; Joachim Secker, Oberhausen, both of Fed. Rep. of Germany

[73] Assignee: Deutsche Babcock Werke Aktiengesellschaft, Oberhausen, Fed. Rep. of Germany

[21] Appl. No.: 707,648

[22] Filed: Mar. 4, 1985

[30] Foreign Application Priority Data

Mar. 20, 1984 [DE] Fed. Rep. of Germany ....... 3410143

[51] Int. Cl.⁴ ............................................ B01D 53/24
[52] U.S. Cl. ....................................... 55/269; 55/309; 55/343; 55/349; 209/144; 210/512.2
[58] Field of Search .................. 55/269, 309, 343–349; 209/211, 144; 210/512.2

[56] References Cited

U.S. PATENT DOCUMENTS

| 3,747,306 | 7/1973 | Wikdahl | 55/349 |
| 4,273,565 | 6/1981 | Worley | 55/343 |
| 4,285,706 | 8/1981 | Dehne | 55/343 |
| 4,398,932 | 8/1983 | Dehne | 55/349 |
| 4,455,154 | 6/1984 | Blasiole | 55/269 X |
| 4,460,391 | 7/1984 | Muller et al. | 55/343 |

FOREIGN PATENT DOCUMENTS 2724667 12/1977 Fed. Rep. of Germany ........ 55/309

Primary Examiner—Charles Hart
Attorney, Agent, or Firm—Max Fogiel

[57] ABSTRACT

Cyclones are arranged within a pressure vessel and are connected, at the gas entry side, with a furnace by way of a feed pipe standing under pressure and a distributor duct. The cyclones are connected, at the gas exit side, to a collecting duct and a discharge pipe. The feed pipe and the discharge pipe are surrounded by an outer pipe with the formation of an annular space. The annular spaces have a connection to the interior space of the pressure vessel, and are connected with a compressor.

11 Claims, 6 Drawing Figures

ARRANGEMENT FOR THE REMOVAL OF DUST FROM GAS STANDING UNDER PRESSURE

BACKGROUND OF THE INVENTION

The present invention concerns a device for the removal of dust from gas which is standing under pressure, has been generated in a pressure-charged fluidized bed furnace, and is conducted to a gas turbine. The device has cylcones which are arranged in several stages one behind the other, and are connected in parallel stage by stage.

In a known device of this kind (EP-OS No. 41 648, DE-OS No. 30 33 424), the dust removal device consisting of cyclones is arranged within the pressure container surrounding the fluidized bed furnace. The combustion air is introduced into the pressure container through a duct pipe surrounding the gas removal pipe and from there through an air distributor box into the fluidized bed furnace. In order to be able to undertake repairs or monitoring operations at the cyclones in this device, one must wait until the parts arranged within the pressure container have cooled down. This cooling-down can claim an appreciable time, particularly due to the great mass of the fluidized stock comprising the fluidized bed furnace.

SUMMARY OF THE INVENTION

The present invention is based on the object of creating a dust removal device according to the species for hot gases generated in a pressure-charged fluidized bed furnace, in which device the cyclones are more easily accessible and which is to be operated at the same pressure as the fluidized bed furnace.

The object of the present invention is achieved by providing an arrangement for the removal of dust from gas which is standing under pressure, has been generated in a pressure-charged fluidized bed furnace, and is conducted to a gas turbine. The arrangement has cyclones which are arranged in several stages one behind the other and are connected in parallel stage by stage. The cyclones are housed in a pressure vessel separated from the fluidized bed furnace, and are connected, at the gas entry side, with the fluidized bed furnace through at least one feed pipe standing under pressure and a distributor duct. The cyclones are connected, at the gas exit side, to a collecting duct and a discharge pipe. The feed pipe and the discharge pipe are on the part lying externally of the pressure vessel surrounded co-axially by an outer pipe with formation of an annular space. The annular spaces have a connection with the interior space of the pressure vessel and are connected with a compressor associated with the gas turbine.

In this arrangement, the separation cyclones are separated from the fluidized bed furnace and arranged in a separate pressure vessel; they can therefore be maintained independently of the fluidized bed furnace. Air under system pressure is introduced into the interior space of the pressure vessel by way of the annular spaces surrounding the feed pipe and the discharge pipe of the gases. In that case, the air is so conducted that the cyclones come into contact as little as possible with the comparatively cooler air. The cooling effect exerted by the air on the cyclones is thereby kept small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
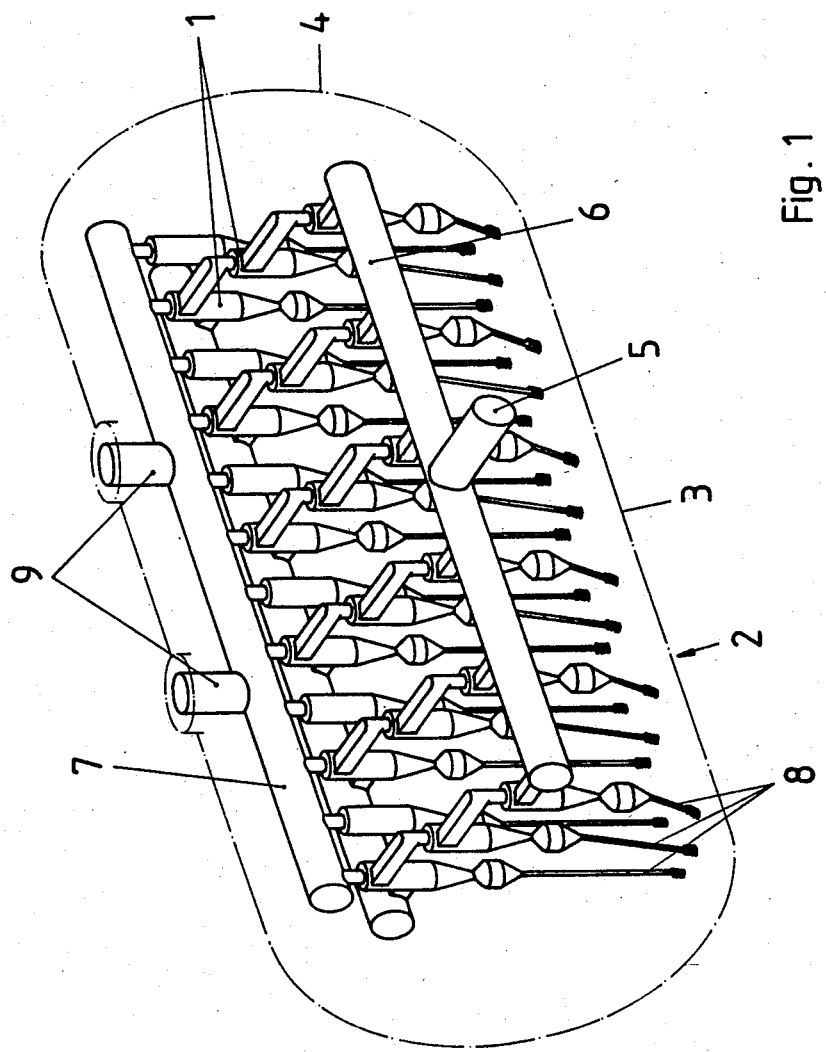
FIGS. 1 to 3 show perspective illustrations of different embodiments of a device according to the present invention.

Cyclones 1, which are arranged within a pressure vessel 2, are provided for the removal of dust from a hot gas generated in a not illustrated fluidized bed furnace. The pressure vessel 2 is formed by a cylindrical shell 3 with laterally bowed ends 4 and arranged horizontally. The gas to be cleaned is brought forward through a feed pipe 5 out of the combustion chamber of the fluidized bed furnace. The feed pipe 5 penetrates the shell 3 of the pressure vessel 2, and opens into a distributor duct 6. Such a feed pipe 5, and such a distributor duct 6, are provided at middle height to both sides of the pressure vessel 2.

Several stages of the cyclones 1 are connected to the distributor duct 6. In that case, the gas entry of the first cyclone stage is respectively connected to the distributor duct 6 and the gas exit of the third and last cyclone stage to a collecting duct 7. The output pipes 8 for the dust separated in the cyclones 1 are led downwardly through the shell 3 of the pressure vessel 2.

The collecting duct 7 is provided in the upper part of the pressure vessel 2. Two discharge pipes 9 are in the case illustrated connected to the collecting duct 7. The cleaned gas is conducted through the discharge pipes 9 to a gas turbine, not illustrated. The collecting duct 7 as well as also the distributor ducts 6 extend parallel to the longitudinal axis of the pressure vessel 2. A symmetrical, space-saving arrangement of the cyclones 1 results in this manner.

The system pressure prevails in the cyclones 1 and in the ducts 6 and 7. The interior space of the pressure vessel 2 is also to be set under this pressure in order to relieve the walls of the gas-conducting parts. For this purpose, the feed pipe 5 and the discharge pipes 9 are each co-axially surrounded by a respective outer pipe 11 with the formation of an annular space 10. The annular spaces 10 are connected to a not-illustrated compressor associated with the gas turbine, and namely in such a manner that the air standing under the system pressure is conducted to and from the pressure vessel 2 in counter flow to the gas flowing in the feed pipes 5 and the discharge pipes 9.

Figure 2:
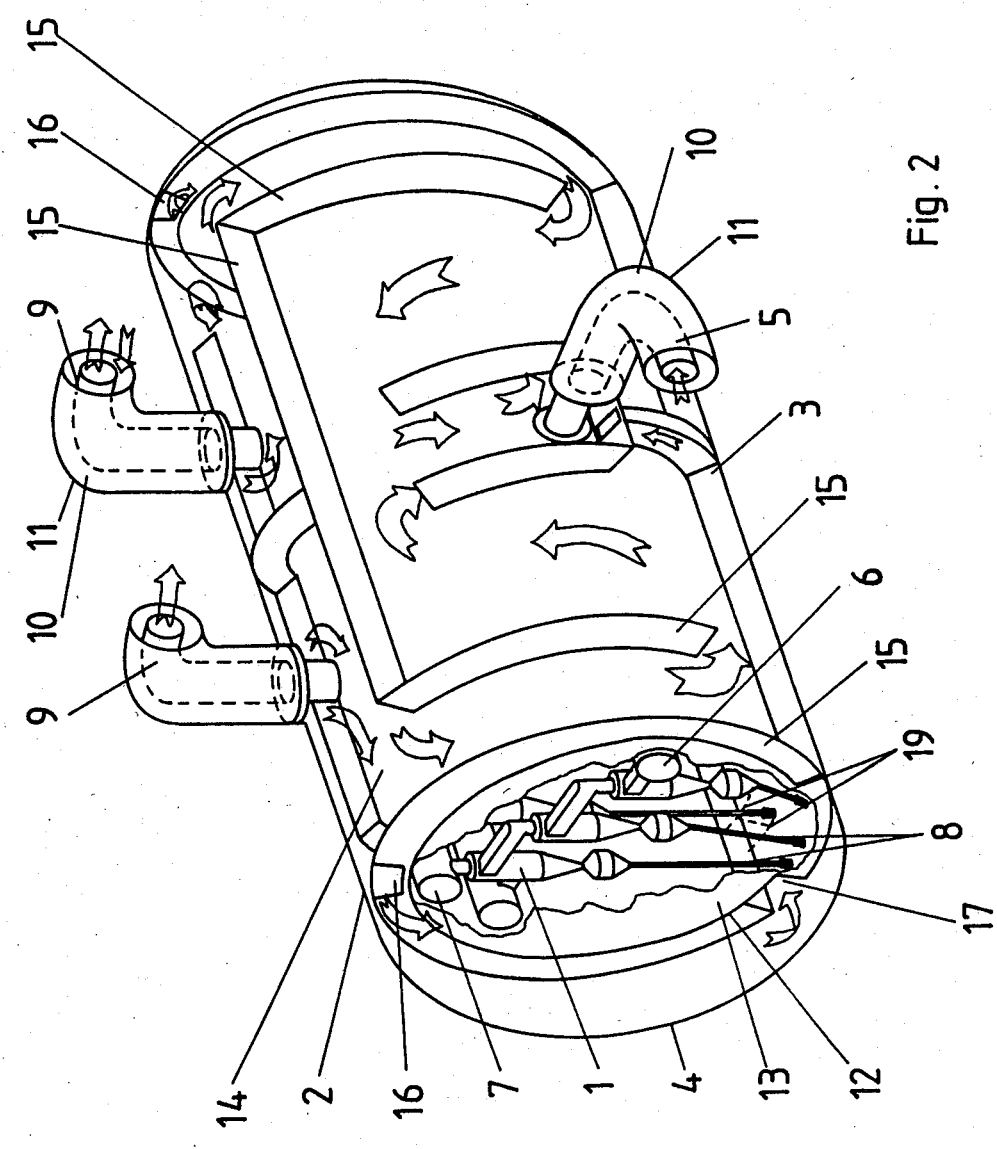

In the embodiment according to FIG. 2, an inner shell 12 with lateral ends 13 is arranged at a spacing from the inside of the shell 3 of the pressure vessel 2. The annular spaces 10 open into the intermediate space 14 formed in this manner so that the air delivered by the compressor and standing under pressure is conducted through the intermediate space 14. Metal deflecting plates 15 are arranged in the intermediate space 14 for the guidance of the air current in and transversely to the longitudinal axis of the pressure vessel, so that a current course results, as represented by the arrows in FIG. 2.

The outer metal deflecting plates 15 facing the bowed ends 4 of the pressure vessel 2 are provided in their upper and lower parts each with a respective passage 16 and 17. A connection between the intermediate space 14 and the space between the end 13 of the inner shell 12 and the bowed end 4 of the pressure vessel 2 is produced through the upper passage 16. The inner shell 12 is hollowed out in its lower part in the region of the passage of the output pipes 8 of the cyclones 1 through the shell 3 of the pressure vessel 2. The hollowed-out part of the inner shell 12 is connected with the passage 17 in the lower part of the outer metal deflecting plate 15 and the annular space 10 surrounding the feed pipe 5. In that case, metal baffle plates 19, which surround the exit ends of the output pipes 8, are provided in the hollowed-out part transversely to the longitudinal axis of the pressure vessel 2. As a result of the air guidance, that has been described, through the intermediate space 14, the system pressure is set in the pressure vessel 2, and a cooling of the shell 3 is attained. This cooling is, however, without the cyclones 1 coming into contact with the air to a significant extent and being cooled.

Figure 3:
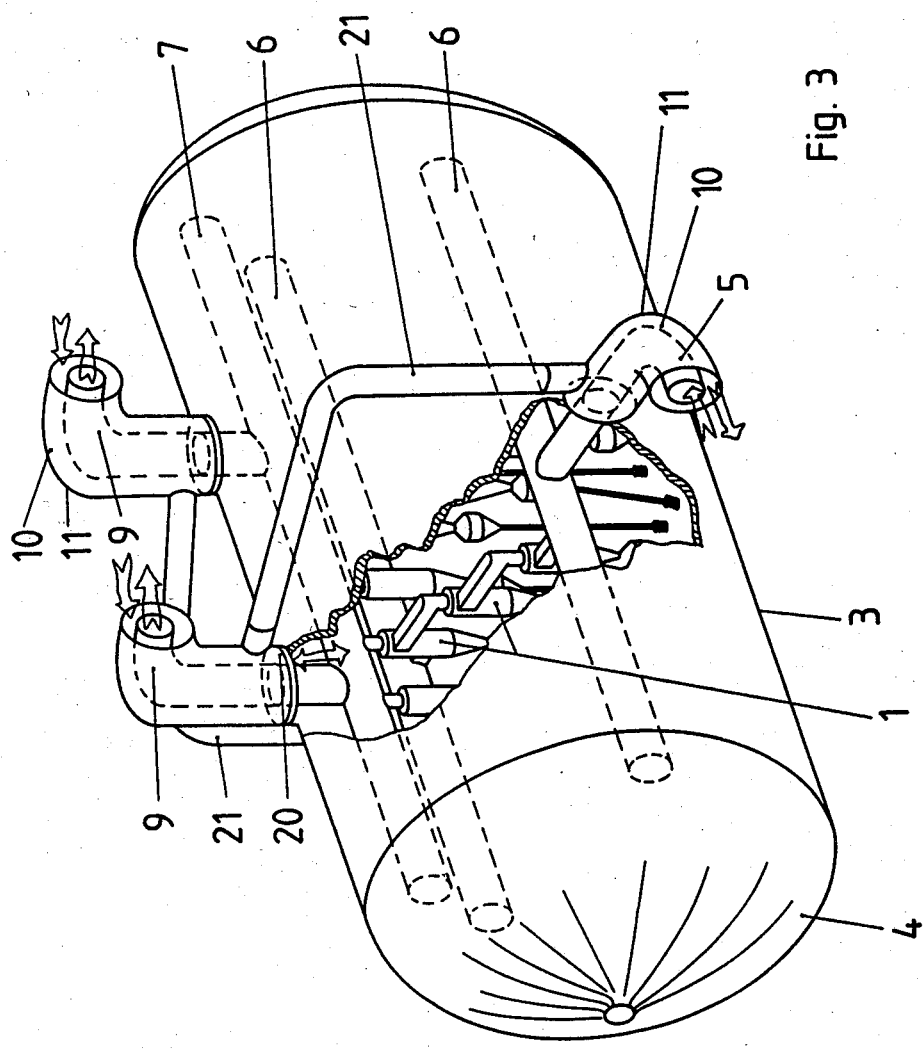

In the embodiment according to FIG. 3, the air fed from the compressor is no longer conducted through the pressure vessel 2. Instead, the annular spaces 10 are closed off, apart from a bore 20, from the interior space of the pressure vessel 2. This bore 20 is provided in the annular flange of the outer pipe 11, which surrounds one of the discharge pipes 9. The annular spaces 10 surrounding the discharge pipe 9 are connected through a bypass duct 21 with the annular spaces surrounding the feed pipes 6. On putting the pressure vessel 2 into operation, air of system pressure is fed through the bore 20 into the interior space of the pressure vessel 2. Once the system pressure has set in the pressure vessel 2, the air continuing to be conducted through the annular spaces 10 surrounding the discharge pipes 9 is conducted further by way of the bypass ducts 21 into the annular spaces 10 surrounding the feed pipes 6.

Figure 4:
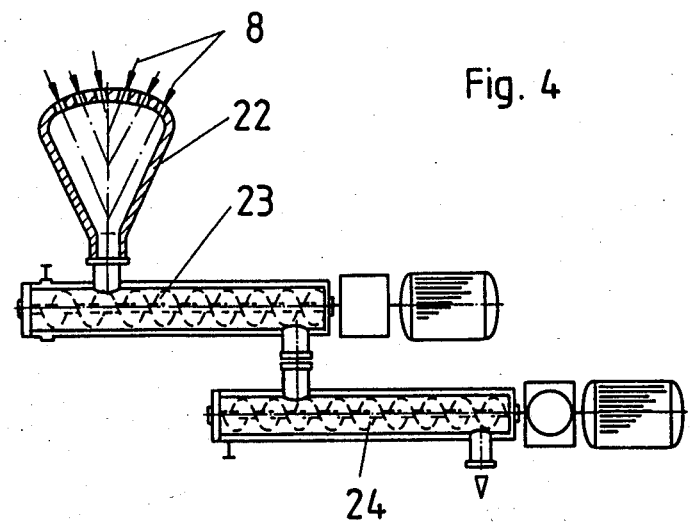
FIGS. 4 to 6 each show an output device for the separated dust.
Figure 5:
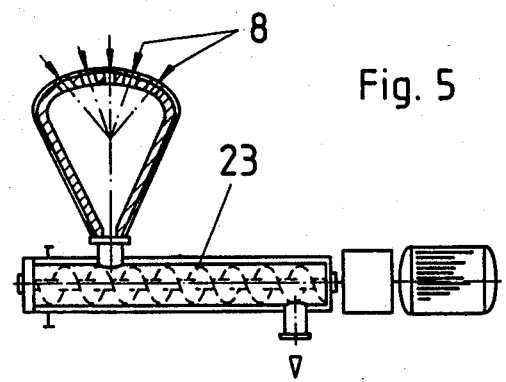
Figure 6:
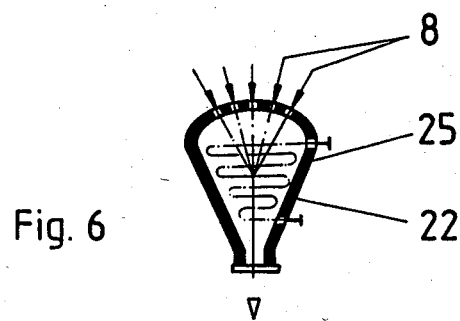

The ends of the output pipes 8 of one stage of the cyclones 1 are, after passage through the shell 3 of the pressure vessel 2, led into a collecting vessel 22. The output end of the collecting vessel 2 is, according to the FIGS. 4 and 5, connected with a cooling device in the shape of a cooling coil 23. Since the greatest part of the separated dust arises in the first cyclone stage, a second cooling coil 24 is connected according to FIG. 4 downstream of the first cooling coil 23. Arranged in the collecting vessel 22, associated with the last cyclone stage, is a pipe coil 25, which is flowed through by a coolant and which causes the cooling of the dust (FIG. 6). In this case, a cooling coil is dispensed with and, in its place, a conventional output device is to be provided, for example a conveyor worm.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Apparatus for the removal of dust from gas which is standing under pressure, has been generated in a pressure-charged fluidized bed furnace, and is conducted to a gas turbine comprising: cyclones arranged in a plurality of stages one behind the other and connected in stage by stage; a pressure vessel separated from the fluidized bed furnace for housing said cyclones; at least one feed pipe standing under pressure, and a distributor duct; a collecting duct and a discharge pipe, said cyclones having a gas entry side connected with the fluidized bed furnace through said feed pipe standing under pressure and said distributor duct; said cyclones having a gas exit side connected to said collecting duct and said discharge pipe; said feed pipe and said discharge pipe being located on a part lying externally of said pressure vessel; an outer pipe surrounding said feed pipe and said discharge pipe and forming an annular space; said annular space having a connection with interior space of said pressure vessel for connection with a compressor associated with the gas turbine; said pressure vessel comprising a double-walled vessel with interior and intermediate space between walls placed separately under pressure; said feed pipe and said discharge pipe being surrounded by annular spaces connected to the interior of said pressure vessel and said compressor, air flowing from said compressor to said pressure vessel for placing said pressure vessel under predetermined pressure.

2. Apparatus according to claim 1, wherein the annular space surrounding said feed pipe and the annular space surrounding said discharge duct are connected through a by-pass duct, one of the annular spaces having a connection to the interior of said pressure vessel.

3. Apparatus according to claim 1, including an inner shell on the inside of said pressure vessel, the annular space surrounding said discharge duct and the annular space surrounding said feed pipe being connected with an intermediate space between said pressure vessel and said inner shell.

4. Apparatus according to claim 3, including metal deflecting plates in said intermediate space.

5. Apparatus according to claim 3, wherein said cyclones have output pipes and said pressure vessel has a shell, said output pipes passing through said shell of said pressure vessel, said inner shell being hollowed out in a region of said passing through.

6. Apparatus according to claim 1, wherein said pressure vessel is cylindrical, said collecting duct being arranged in an upper part of said pressure vessel and in a longitudinal direction thereof, two distributor ducts being located underneath and parallel to said collecting duct.

7. Apparatus according to claim 1, wherein output pipes of said cyclones of each cyclone stage are brought together in at least one collecting vessel.

8. Apparatus according to claim 7, including cooling means for dust separated in said cyclones and connected with the collecting vessel.

9. Apparatus according to claim 8, wherein said cooling means comprises at least one cooling coil connected to said collecting vessel.

10. Apparatus according to claim 8, including a pipe coil flowed through by a coolant and arranged in said collecting vessel.

11. Apparatus for the removal of dust from gas which is standing under pressure, has been generated in a pressure-charged fluidized bed furnace, and is conducted to a gas turbine, comprising: cyclones arranged in a plurality of stages one behind the other and connected in stage by stage; a pressure vessel separated from the fluidized bed furnace for housing said cyclones; at least one feed pipe standing under pressure, and a distributor duct; a collecting duct and a discharge pipe, said cyclones having a gas entry side connected with the fluidized bed furnace through said feed pipe standing under pressure and said distributor duct; said cyclones having a gas exit side connected to said collecting duct and said discharge pipe; said feed pipe and said discharge pipe being located on a part lying externally of said pressure vessel; an outer pipe surrounding said feed pipe and said discharge pipe and forming an annular space; said annular space having a connection with interior space of said pressure vessel for connection with a compressor associate with the gas turbine; said pressure vessel comprising a double-walled vessel with interior and intermediate space between walls placed separately under pressure; said feed pipe and said discharge pipe being surrounded by annular space connected to the interior of said pressure vessel and said compressor, air flowing from said compressor to said pressure vessel for placing said pressure vessel under predetermined pressure; the annular space surrounding said feed pipe and the annular space surrounding said discharge duct being connected through a by-pass duct, one of the annular spaces having a connection to the interior of said pressure vessel; an inner shell on the inside of said pressure vessel, the annular space surrounding said discharge duct and the annular space surrounding said feed pipe being connected with the intermediate space between said pressure vessel and said inner shell; metal deflecting plates in said intermediate space; said cyclones having output pipes passing through said shell of said pressure vessel, said inner shell being hollowed out in a region of said passing through; said pressure vessel being cylindrical, said collecting duct being arranged in an upper part of said pressure vessel and in a longituidnal direction thereof, two distributor ducts being located underneath and parallel to said collecting duct; output pipes of said cyclones are brought together in at least one collecting vessel; cooling means for dust separated in said cyclones and connected with the collecting vessel; said cooling means comprising at least one cooling coil connected to said collecting vessel; and a pipe coil flowed through by a coolant and arranged in said collecting vessel.

* * * * *